INVENTOR
Theron R. Kelley

United States Patent Office 3,460,875
Patented Aug. 12, 1969

3,460,875
SLEEVE BEARING
Theron R. Kelley, Mattapoisett, Mass., assignor to Tedan, Inc., West Hanover, Mass., a corporation of Massachusetts
Continuation of application Ser. No. 572,805, Aug. 16, 1966. This application May 7, 1968, Ser. No. 727,382
Int. Cl. F16c 27/00, 33/00, 33/66
U.S. Cl. 308—238                                    5 Claims

ABSTRACT OF THE DISCLOSURE

A rotatable unitary sleeve bearing having outwardly facing lines of longitudinally spaced apart substantially isosceles trapezoid-shaped lands radially spaced by like but reverse-shaped longitudinally extending water channels, the side walls of the lands below the spacing therebetween defining angular deflectors from the base of the channels.

---

This application is a continuation of application Ser. No. 572,805 filed Aug. 16, 1966.

The invention disclosed herein is a sleeve bearing of the type which is secured to and rotatable with the drive shaft. More particularly, the bearing is made of an elastomeric material and the bearing is self-cleaning, water-lubricated, and offers a minimum of frictional resistance.

Bearings of this type have heretofore been proposed and disclosed, such for example as those shown in the following U.S. patents: Annis, No. 1,797,223, FIG. 3; Aker, No. 2,203,039; and more recently Kirk, No. 3,023,059 (column 2, lines 35 to 47). So far as applicant is aware, this type of bearing has not been extensively adopted. The reason why this type of bearing has not been extensively adopted appears to be because it has always been considered essential to retain a maximum bearing area, thus greatly minimizing the size of the passages or channels for water flow.

The greatest need for self-cleaning, and particularly in small craft for which the bearing shown herein is primarily intended, is when the craft is running at low speed, such as in shallow water, or when mooring or berthing. When running at low speed, the pressure forcing the water through the bearing is greatly reduced and, if in shallow water, the amount of sand and sediment is greatest. The condition becomes worse when berthing or mooring as the engines frequently are reversed with the resultant turbulence stirring up the bottom silt.

The problem, therefore, is to maintain a maximum volume of water within the bearing, and to maintain a maximum flow. This can only be accomplished by providing large channel or flow areas, which of necessity reduces the bearing surface area. The concept of reducing the bearing surface area has always been resisted because of the failure to recognize that the water flowing through the bearing is for all purposes practically incompressible, and therefore constitutes a bearing or supporting surface. Because of this, the physical bearing surface need only be that required to maintain shaft alignment.

The object of the invention is to provide a bearing wherein there is a proper relationship between the sleeve bearing surfaces and the total surface area to assure proper alignment of the shaft while maintaining maximum volume of water within the bearing, and maximum flow of water through the bearing.

A further object is the sleeve bearing of an elastomeric material wherein the total bearing area is divided into a plurality of relatively small bearing areas, each one of which is compressible and expands in all directions, thus securing compensation for shaft misalignments, and providing an overall cushion somewhat analogous to a cat's paw.

The foregoing and other objects and advantages will become apparent from the description herein when read in light of the accompanying drawings wherein.

Figure 1:
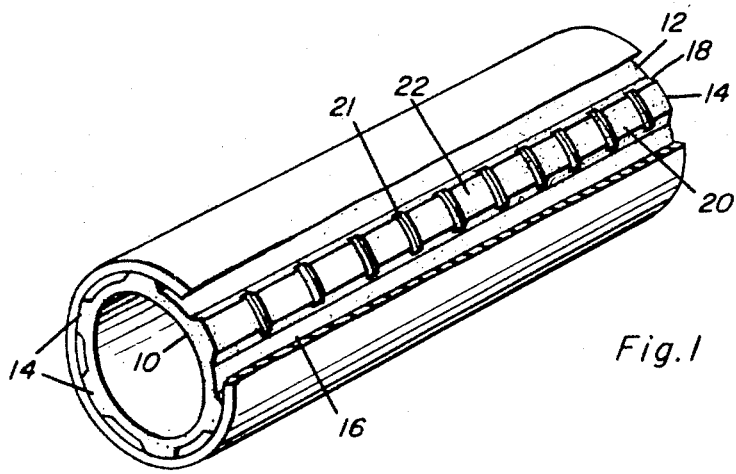
FIGURE 1 is perspective of the bearing positioned within a supporting bushing, the bushing being partially broken away to show the bearing surface structure.
Figure 3:
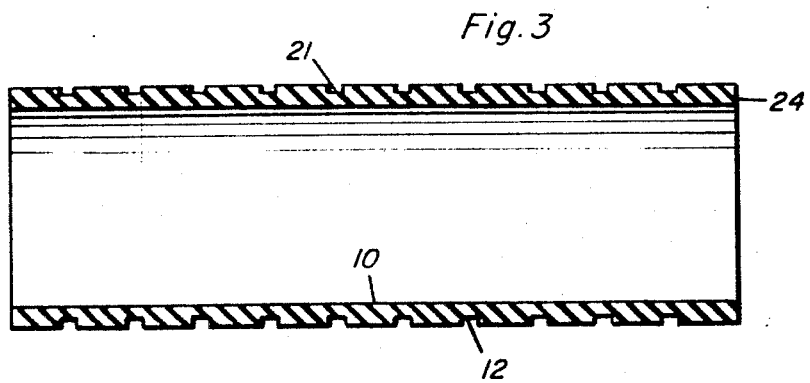
FIGURE 3 is an end view to show the relationship of the bearing support areas and the water channels therethrough.
Figure 2:
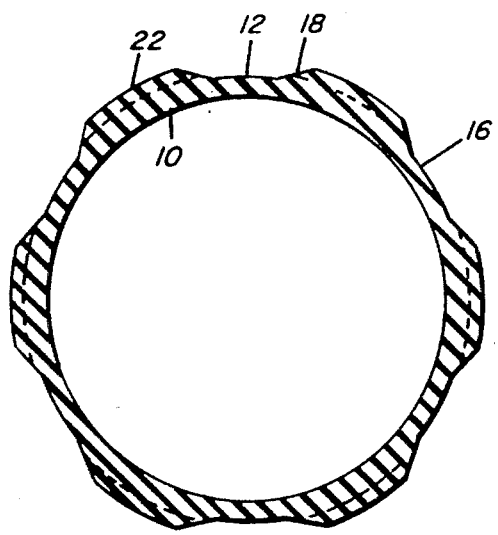
FIGURE 2 is a cross-sectional view longitudinally of FIGURE 1.

More particularly, the bearing is a sleeve 10 of elastomeric material which is secured to the drive shaft (not shown) and rotates in the bushing A. The bushing may be of metal or a suitable plastic and is fixed against rotation in a bearing block, as is well known in the art. The sleeve 10 has an inner cylindrical surface 18 and an outer cylindrical surface 12 (shown in full and dotted lines, FIGURE 2). Extending radially from the outer surface are a plurality of lands 14, which can best be described as being isosceles trapezoids (in cross-section) with concentric curved bases, the lands 14 being equally spaced circumferentially of the sleeve and extending longitudinally the full length thereof. The spacing between the lands define an equal number of similar, but reverse shaped water main flow channels 16, the base of each channel being the surface 12. The side walls 18 of the lands are thus at an obtuse angle to the base of the channels and, as subsequently pointed out, constitute water deflectors.

The lands 14 are subdivided longitudinally at spaced intervals by circumferentially extending grooves 21 to thus provide a plurality of substanially rectangular circumferentially crowned land bearing areas 22. The grooves 21 are of less depth the lands and the side walls between the base of the channel and the base of the grooves define angular deflectors 19 extending the entire length of the bearing sleeve. The grooves 21 form supplemental cross-over channels interconnecting the main flow channels 16. With the lands subdivided as indicated, they become similar to a plurality of action-buttons 22, which when subjected to a compression force may expand in all directions. If there be any misalignment of the shaft, the action-buttons will individually adjust as necessary to the misalignment without any distortion of the sleeve.

The disclosed embodiment is preferably made of polyurethane having a durometer reading of 94 on the A scale. It is obvious that other elastomeric materials may be used; however, softer materials will not be long-wearing and harder materials will increase frictional resistance. The embodiment shown is for a one and one-half inch shaft and the diameter across the lands is 1¾", and that at the base of the main channels is 1⅛". The length of the sleeve and bushing A is six inches, and by spacing the supplemental channels one-half inch apart, each land is divided into eleven action-buttons, giving a total of sixty-six individual land bearing areas. The supplemental channels are one-eighth inch wide and one-sixteenth inch deep. With this construction, if the outer surface at the lands were a full cylinder, there would be approximately 33 square inches of area, whereas the area of the lands, ignoring the supplemental channels, is approximately 13 square inches. Thus, the water surface in contact with bushing A is substantially greater than that of the land bearing area, and when the area of the grooves of the supplemental channels is deducted from the land area, the ratio is approximately two to one in favor of the free surface or water area.

Extensive tests of this bearing have shown that with this large water channel area, strong flow therethrough is maintained at slow speeds and without clogging of the channels and the land bearing area is sufficient to maintain the shaft in proper alignment. The reason for the satisfactory results is apparent when it is considered the rotation of the shaft in either direction results in the deflectors 19 urging the water circumferentially outward as it is passing longitudinally through the main channels. The deflection is toward the circumferential channels and, as the water will be seeking to flow where there is least resistance, currents will be set up carrying the sediment with it away from the lands and through the grooves. If by chance sediment should get between a surface area of the bearing and the bushing, only the one land area will be affected and sediment may readily work out at any of the four edges. In practice, the sleeve is generally made approximately one inch longer than the bushing, to permit lengthwise adjustment of the shaft relative to the bushing without the bearing losing surface contact with the bushing. The sleeve bearing may be secured to the shaft by a shrink fit or by suitable adhesives.

The following is claimed:

1. A unitary rotatable sleeve bearing of the type described comprising an elongated sleeve of elastomeric material having a plurality of outwardly facing circumferentially spaced lands extending longitudinally the full length of the sleeve, said lands in cross-section being substantially the shape of an isosceles trapezoid and defining therebetween reverse but like shaped longitudinally extending main water channels, the lands being further subdivided into a plurality of land bearing areas by transversely extending grooves longitudinally spaced along the lands and providing supplemental water channels interconnecting the main water channels, said supplemental channels being of lesser depth than the lands whereby the side walls of the lands below the channels define angular deflectors extending angularly from the bottom of the main channels to the bottom of the supplemental channels.

2. The sleeve bearing defined in claim 1 wherein the supplemental water channels are circumferential.

3. The sleeve bearing defined in claim 1 wherein the surface area of the water channel is greater than the surface area of the land bearing surfaces.

4. The sleeve bearing defined in claim 2 wherein the surface area of the water channel is approximately twice the surface area of the land bearing areas.

5. A unitary rotatable bearing of the type described comprising an elongated sleeve having inner and outer cylindrical surfaces, a plurality of lands extending radially from the outer cylindrical surface, each land having side walls and outwardly facing crowned bearing areas, the lands being equally spaced circumferentially of the sleeve and extending longitudinally the length thereof, the spacing between the lands defining channels there between, and the outwardly facing crowned area of the lands being approximately equal to the surface area of the outer cylindrical surface defining the bottom of the channels, said lands are trapezoids in cross section the narrower base being the outwardly facing crowned bearing surface area, and each land is subdivided into a plurality of bearing areas by circumferentially extending grooves of lesser depth than the lands.

References Cited

UNITED STATES PATENTS

| | | | |
|---|---|---|---|
| 2,282,345 | 5/1942 | Ruths. | |
| 2,719,762 | 10/1955 | Weaver | 308—240 X |
| 3,131,977 | 5/1964 | Wirtz | 308—238 |
| 3,167,361 | 1/1965 | Snapp et al. | 308—240 X |

CARROLL B. DORITY, Jr., Primary Examiner

U.S. Cl. X.R.

308—240